UNITED STATES PATENT OFFICE.

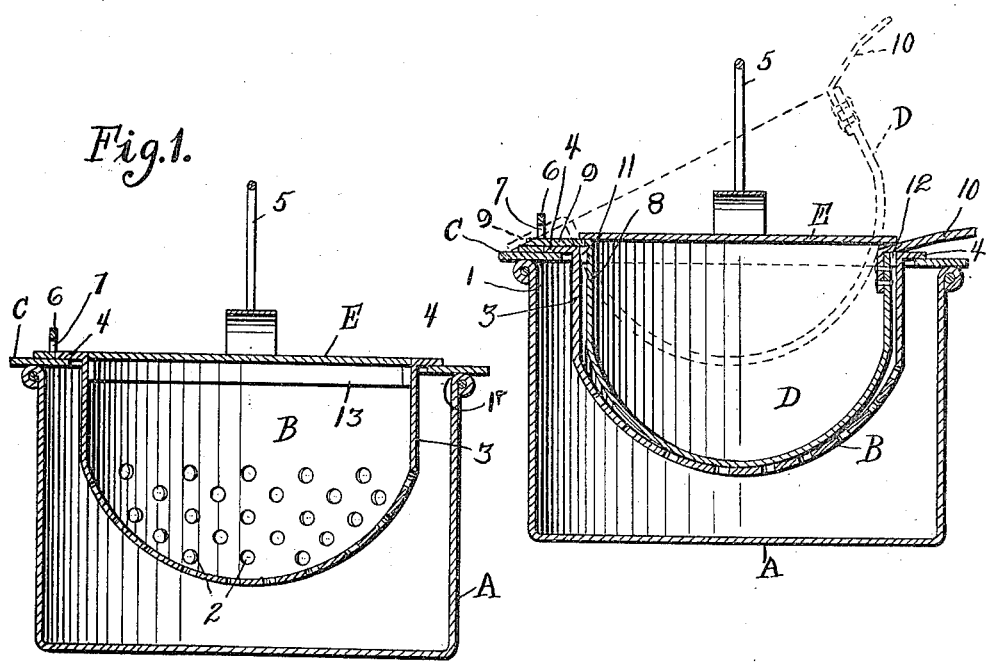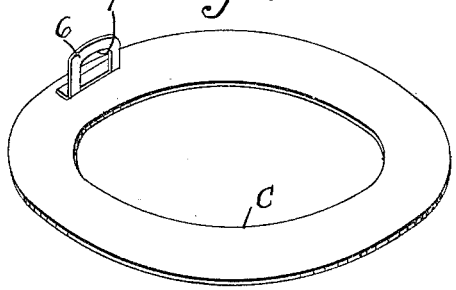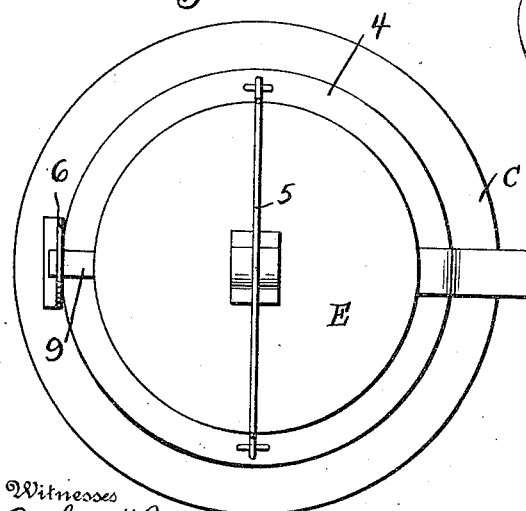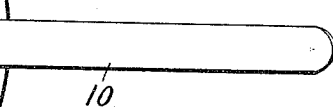

MINNIE FOURNIER, OF MINONG, WISCONSIN.

COMBINED VEGETABLE COOKER AND DRAINER.

1,224,731. Specification of Letters Patent. Patented May 1, 1917.

Application filed August 14, 1916. Serial No. 114,898.

*To all whom it may concern:*

Be it known that I, MINNIE FOURNIER, a citizen of the United States, residing at Minong, in the county of Washburn, State of Wisconsin, have invented certain new and useful Improvements in Combined Vegetable Cookers and Drainers; and I do hereby declare the following to be a full, clear, and exact description of the invention, such as will enable others skilled in the art to which it appertains to make and use the same.

This invention relates to certain novel and useful improvements in a kitchen utensil which is adapted especially to be employed as a vegetable cooker, a steamer or drainer and in which certain elements thereof may if desired be employed for mashing vegetables, such as potatoes, and the like.

In carrying out my invention it is my purpose to provide a utensil of this character which may be suspended in a kettle, or other receptacle, for the purpose of cooking, steaming, or draining the vegetables, the utensil embodying several separable or distinct parts which may be readily and quickly assembled and disassembled when desired.

Still further an object of my invention is the provision of a utensil of this character which will embody the desired features of simplicity, efficiency and convenience, and which may be manufactured and marketed at a relatively low cost.

With the above recited objects and others of a similar nature in view, my invention consists in the construction, combination and arrangement of parts set forth in and falling within the scope of the appended claim.

In the drawings:—

Figure 1 is a vertical sectional view showing the device as applied to a kettle and employed as a steamer or drainer;

Fig. 2 is a similar view of the device illustrating in full lines its use as a double boiler, and in dotted lines its use as a potato masher;

Fig. 3 is a top plan view of what is shown in Fig. 2, and

Fig. 4 is a perspective view of the element employed for suspending the receptacles in a kettle.

Referring now to the accompanying drawings in detail, the letter A indicates a receptacle of any suitable sort, such as a kettle or pot, the rim at the mouth of the receptacle being designated by the numeral 1. The letter B indicates a container, which constitutes the cooking and draining member of my device the bottom of which is substantially hemispherical and perforated as at 2, while its side wall 3 is imperforate. This imperforate portion is formed with an outstanding annular flange 4, while 5 indicates an ordinary pivoted bail for lifting and carrying the member B. The letter C indicates a ring which is adapted to rest upon the rim 1 at the mouth of the kettle, this ring having an ear 6 extending vertically upward therefrom, such ear being provided with a transverse opening 7. The letter D indicates a second receptacle of imperforate construction, which is shaped to correspond to the receptacle B but of a size somewhat smaller than such receptacle so that it may swing freely into and out of the same when the device is employed as a masher as will be subsequently explained. Extending laterally from the top portion of the wall 8 of the receptacle D is a stud 9. Extending from said wall 8, diametrically opposite the stud 9 is a handle 10 by means of which the receptacle D may be carried and handled when operated to act as a vegetable masher.

The cover for the entire device is indicated by the letter E, this cover having a slot 11 in the downwardly directed flange 13 thereof to accommodate the stud 9 and there is also formed in the flange at a point diametrically opposite the slot 11, a slot 12 for receiving therein the handle 10, said downwardly directed flange 13 being thus permitted to fit snugly within the receptacle B whether or not the receptacle D is positioned therein.

From the above description, taken in connection with the accompanying drawings, the construction and manner of employing my invention will be readily apparent.

If it is desired to use the device merely as a cooker, the member B is employed, the vegetables being placed therein, and the member B is then lowered into the kettle containing the cooking water. When it is intended to use the member B as a drainer or steamer, the ring C is applied to the rim of the kettle and the member B containing the vegetables placed within the ring so that it will be held suspended by its flange 4 above the water in the kettle. When it is desired to use the device as a double cooker, the member D is brought into use, the stud 9 being placed in the slot of the ear 6, so that the stud and slot form a loose detachable connection. To employ the member D as a masher or crusher for the vegetables, it is only necessary to rock the receptacle D up and down by means of the handle 10 as shown in dotted lines in Fig. 3, the stud 9 working in the ear 6 acting as a hinge in the sense that the stud is fulcrumed to rock in the ear.

From the above description, taken in connection with the accompanying drawings, it will be seen that I have provided a convenient, labor saving utensil, which may be used as a combined cooker, vegetable masher or crusher, drainer or steamer, and in which the parts may be quickly and easily cleaned, and also manipulated, thus saving considerable time over the ordinary practice of using several dishes or utensils in the cooking of vegetables.

What I claim is:

An apparatus for reducing a solid food product to a pulp and comprising the combination with a cooking vessel of a perforated outer receptacle arranged within the vessel and adapted to contain the product to be cooked, an outstanding flange on the receptacle of a diameter less than that of the vessel, a ring engaged upon the rim of the vessel and removably supporting the outer receptacle with its flange resting thereon, an upstanding apertured ear fixed to the ring, an inner receptacle smaller than and removably engaged in the outer receptacle, a lug formed on one side of the inner receptacle extending through the ear and loosely engaging the same, and a handle carried by the opposite side of the inner receptacle by which the latter may be rocked into and out of the outer receptacle with said lug and ear as a fulcrum, whereby to force the cooked product through the perforations of the outer receptacle in the form of a pulp.

In testimony whereof, I affix my signature, in the presence of two witnesses.

MINNIE FOURNIER.

Witnesses:
F. T. JENKS,
GROVER C. FILLBACH.

Copies of this patent may be obtained for five cents each, by addressing the "Commissioner of Patents, Washington, D. C."